United States Patent
Kamata et al.

[11] Patent Number: 6,142,428
[45] Date of Patent: Nov. 7, 2000

[54] METHOD OF CLAMPING PIPES AND SPACER DEVICE USED IN THE METHOD FOR REGULATING SPACE BETWEEN THE PIPES

[76] Inventors: Kasaku Kamata, 2-6-21, Ishibashi, Ikeda-shi, Osaka; Akira Kamata, 655-74, Fujita, Okayama-shi, Okayama-ken, both of Japan

[21] Appl. No.: 09/290,782

[22] Filed: Apr. 13, 1999

[30] Foreign Application Priority Data

Apr. 16, 1998 [JP] Japan .................................. 10-106200

[51] Int. Cl.[7] .................................................... F16L 3/22
[52] U.S. Cl. ........................ 248/68.1; 248/49; 248/74.1
[58] Field of Search .............................. 248/68.1, 49, 70, 248/72, 73, 74.1, 67.7

[56] References Cited

U.S. PATENT DOCUMENTS

| | | | |
|---|---|---|---|
| 3,464,661 | 9/1969 | Alesi, Jr. ................................. | 248/68.1 |
| 3,856,246 | 12/1974 | Sinko ..................................... | 248/68.1 |
| 4,244,542 | 1/1981 | Mathews ................................. | 248/49 |
| 4,306,697 | 12/1981 | Mathews ................................. | 248/68.1 |
| 4,601,447 | 7/1986 | McFarland ............................... | 248/49 |
| 4,998,691 | 3/1991 | Brown .................................... | 248/74.1 |
| 5,014,940 | 5/1991 | Sherman ................................. | 248/74.1 |
| 5,215,281 | 6/1993 | Sherman ................................. | 248/74.1 |

FOREIGN PATENT DOCUMENTS

| | | |
|---|---|---|
| 54155633 | 4/1953 | Japan . |
| 736222 | 7/1995 | Japan . |
| 9126360 | 5/1997 | Japan . |

Primary Examiner—Anita M. King
Assistant Examiner—Walter Landry
Attorney, Agent, or Firm—Webb Ziesenheim Logsdon Orkin & Hanson, P.C.

[57] ABSTRACT

There is disclosed a method of clamping a plurality of pipes such as conduit tubes, cables, water pipes or the like to a pipe clamping face of a clamp base secured to a wall surface, a ceiling surface or the like in such a manner that the pipes are clamped to the pipe clamping face with a predetermined space therebetween in a direction perpendicular or substantially perpendicular to the pipe clamping face. In this method, one of the pipes located in the lowest layer or predetermined ones of the pipes including the lowest-layer pipe and spaced apart from each other with a spacer device interposed therebetween is/are clamped to the pipe clamping face of the clamp base by using a first clamper. Then, the other pipe is clamped to the pipe clamping face of the clamp base by using a second clamper with the spacer device being interposed between the other pipe and the highest-layer one of the pipe or pipes clamped by the first clamper.

14 Claims, 10 Drawing Sheets

METHOD OF CLAMPING PIPES AND SPACER DEVICE USED IN THE METHOD FOR REGULATING SPACE BETWEEN THE PIPES

BACKGROUND OF THE INVENTION

1. Field of the Invention

The present invention relates to a method of clamping a plurality of pipes such as conduit tubes, cables, water pipes or the like to a pipe clamping face of a clamp base secured to a wall surface, a ceiling surface or the like in such a manner that the pipes are clamped to the pipe clamping face with a predetermined space therebetween in a direction perpendicular or substantially perpendicular to the pipe clamping face. The invention relates also to improvement of a spacer device for use in the method for regulating space between the pipes.

2. Description of the Related Art

For disposing a plurality of pipes with a predetermined vertical space therebetween, according to a typical conventional method, as shown in FIG. 15, a clamp base 54 to be fixedly attached to an attached face W of e.g. a wall surface is constructed as a framework comprising a parallel-cross like assembly which consists of a plurality of crosspieces 54A using angles each having a pipe clamping face 54a and a pair of right and left struts 54B also using angles for fixing and connecting opposed ends of the respective crosspieces 54A with a predetermined vertical space therebetween. Then, after a saddle 55 having a semicircular pipe-holding face extending substantially along the outer peripheral face of the pipe P is fitted on the pipe P mounted on each crosspiece 54A, opposed ends of this saddle 55 are fastened to the crosspiece 54A by means of bolts 56 and nuts 57.

With the above method, however, it is necessary to prepare plural kinds of clamp bases 54 each having a predetermined number of crosspieces 54A in accordance with the number of pipes P to be disposed in the vertical direction. Moreover, between the vertically adjacent crosspieces 54A, a disposing space corresponding to the outer diameter of the pipe P and also a work space for enabling the disposing operation of the pipe P need to be reserved. As a result, this conventional method suffers the problem of inviting disadvantageous enlargement of the entire clamp base 54 as well as enlargement of the disposing pitch of the pipes P.

In an attempt to overcome the above problem, the convention has proposed a modified method illustrated in FIGS. 13 and 14. In this method, as shown, there is provided a pipe sleeper 50 formed of synthetic resin material and having a semicircular pipe receiving face 51 for receiving the pipe P. In a bottom face 50b of this sleeper 50 opposite to the pipe receiving face 51 thereof, there are defined a first engaging projection 53A and a first engaging recess 53B. On the other hand, the clamp base 54 defines, in its pipe clamping face 54a, a second engaging projection 54A and a second engaging recess 54B. Then, after detachably engaging the first engaging projection 53A and the first engaging recess 53B with the second engaging recess 55B and second engaging projection 55A respectively along the vertical direction, the pipe P is disposed on the pipe receiving face 51 of the pipe sleeper 50. Next, on an upper face 50a of this pipe sleeper 50, another pipe sleeper 50 of the identical shape is placed in the vertically reversed posture, and a third engaging projection 52A and a third engaging recess 52B defined in these sleepers are engaged with each other, whereby the pipe P is clamped between the opposed pipe receiving faces 51 of these two pipe sleepers 50. By repeating these steps in sequence, a plurality of pipes P may be clamped one after another (see e.g. Japanese laid-open utility model gazette No. Sho. 54-155633, Japanese published utility model gazette No. Hei. 7-36222).

According to the conventional pipe clamping method described above, the pipes P are clamped by vertically engaging and connecting the plurality of pipe sleepers 50 one after another to the pipe clamping face 54a of the clamp base 54. Hence, if looseness develops in the engagement between the clamp base 54 and the pipe sleeper 50 and/or the engagement between adjacent pipe sleepers 50, the clamped condition of the pipe P tends to become unstable. In particular, the farther from the pipe clamping face 54a of the clamp base 54, the more unstable the clamped condition of the pipe P.

Therefore, in order to restrict such looseness of the pipes P, it becomes necessary to improve the machining precision of the respective engaging projections and recesses to be formed in the clamp base 54 and pipe sleepers 50 and also to increase the margin or amount of engagement between each engaging projection and recess. Further, the pipe clamping face 54a of the clamp base 54 too needs to have the second engaging projection 55A and second engaging recess 55B specially configured to match the first engaging projection 53A and first engaging recess 53B of the pipe sleeper 50. As a whole, the conventional method tends to invite increased costs as well as increased troubles for the engagement of the pipe sleepers 50.

SUMMARY OF THE INVENTION

The present invention has been made in view of the above-described state of the art. Namely, in a method of clamping a plurality of pipes such as conduit tubes, cables, water pipes or the like to a pipe clamping face of a clamp base secured to a wall surface, a ceiling surface or the like in such a manner that the pipes are clamped to the pipe clamping face with a predetermined space therebetween in a direction perpendicular or substantially perpendicular to the pipe clamping face, the first object of the invention is to provide improvement of such method which assures reliable and stable clamping of the pipes while enabling reduction in the manufacture costs, greater ease and higher efficiency in the assembly operation and which allows also high efficiency in an operation for adding a new pipe(s) to the existing pipes when such addition becomes necessary. The second object of the present invention is to provide an improved spacer device for use in the method which allows reliable and stable clamping of pipes with a predetermined space therebetween and which allows also further reduction in the manufacture costs.

For accomplishing the above-noted objects, according to the first characterizing feature of the present invention, in a method of clamping a plurality of pipes such as conduit tubes, cables, water pipes or the like to a pipe clamping face of a clamp base secured to a wall surface, a ceiling surface or the like in such a manner that the pipes are clamped to the pipe clamping face one above another with a predetermined space therebetween in a direction perpendicular or substantially perpendicular to the pipe clamping face, the method comprises the steps of:

clamping one of the pipes located in the lowest layer or predetermined ones of the pipes including the lowest-layer pipe and spaced apart from each other with a spacer device interposed therebetween to the pipe clamping face of the clamp base by using a first clamper; and clamping subsequently the other pipe to the pipe clamping face of the clamp base by using a second clamper with the spacer device being interposed between the other pipe and the highest-layer one of the pipe or pipes clamped by the first clamper.

With the above-described feature of the present invention, when a plurality of pipes are to be clamped to the pipe clamping face of the clamp base by the predetermined space therebetween in the direction perpendicular or substantially perpendicular to the pipe clamping face, first, of the plurality of pipes to be clamped, one to be disposed in the lowest layer or predetermined ones of the pipes including the lowest-layer pipe and spaced apart from each other with the spacer devices interposed therebetween is/are clamped to the pipe clamping face of the clamp base by using the first clamper.

Thereafter, on the highest-layer one of the pipe or predetermined pipes which was (were) clamped by the above step, the other pipe is placed and clamped by using the second clamper with the spacer device interposed therebetween.

With the above-described method, the lowest-layer pipe or predetermined number of pipes including the lowest-layer pipe which are clamped first by the first clamper is/are clamped also by the second clamper. This means that the pipe(s) in the lower layer is/are clamped more firmly than the upper layer pipes. Further, the pipe clamping operation using the second clamper may be carried out in a stable and efficient manner by utilizing the pipe(s) which was/were clamped already by the first clamper. Hence, the clamping operations of the plurality pipes may be effected with greater ease and less trouble than the case in which all of these pipes are to be clamped at one time to the clamp base.

Moreover, since the pipes are clamped by using two clampers, the pipes may be clamped reliably and firmly to the pipe clamping face of the clamp mount even when some manufacturing irregularity exists in the attached portions between the two clampers and the clamp mount. And, the clampers and the clamp mount may be manufactured with tolerance corresponding to the margin for such irregularity.

In addition, when there arises the necessity of adding a new pipe to the existing pipes clamped by the two clampers, the first clamper will be removed from the clamp base; then, the new pipe will be clamped to the pipe clamping face of the clamp base by using the third clamper with the spacer device being interposed between this new pipe and the uppermost layer one of the existing pipes. Accordingly, when the first clamper is removed, the existing pipes may remain clamped. Also, as the third clamper may be clamped by utilizing the clamping space previously used by the first clamper, there is no need to replace the clamp base, either.

Consequently, the invention has achieved its first object of providing an improved method which assures reliable and stable clamping of the pipes while enabling reduction in the manufacture costs, greater ease and higher efficiency in the assembly operation and which allows also high efficiency in an operation for adding new pipes to the existing pipes when such addition becomes necessary.

According to the second characterizing features of the present invention, in the method described above, the first clamper and the second clamper each comprises a U-shaped bolt exhibiting a substantially U configuration as viewed along the axial direction of the pipe and a pair of nuts threaded to opposed ends of the U-shaped bolt; and the pipe clamping face of the clamp base defines an attachment hole for the U-shaped bolt of the first clamper and another attachment hole for the U-shaped bolt of the second clamper with the holes being spaced apart from each other in the axial direction of the pipe.

With the above-described second characterizing feature of the present invention, the method requires only two kinds of U-shaped bolts and nuts as the first and second clampers, plus the attachment holes of these U-shaped holes in the pipe clamping face of the clamp base. Accordingly, further reduction in the manufacture costs will be possible.

According to the third characterizing feature of the present invention, in the above-describe method, between the pipe clamping face of the clamp base and the lowermost layer pipe, there is provided a cradle having an arcuate receiving face extending along the outer peripheral face of the pipe and a pair of engaging portions engageable respectively with opposed legs of the U-shaped bolt in the perpendicular direction.

With the third feature described above, the lowest layer pipe may be received and mounted in a stable manner by the arcuate receiving face of the cradle. Moreover, as the opposed legs of the U-shaped bolt are engaged in the perpendicular direction with the engaging portions, there will hardly occur inadvertent change in the posture, orientation or position of the cradle during the fastening operations of the U-shaped bolt. As a result, the pipe may be clamped in the predetermined posture reliably and easily.

According to another aspect of the present invention, there is provided a spacer device for use in the pipe clamping method described above. In particular, this spacer device is adapted for regulating space between adjacent pipes when a plurality of pipes are clamped to a pipe clamping face of a clamp base in a direction perpendicular or substantially perpendicular to the pipe clamping face with a predetermined space therebetween by using a U-shaped bolt inserted into attachment holes defined in the pipe clamping face and nuts to be threaded to opposed ends of the U-shaped bolt. The spacer device, according to the characterizing feature of the present invention, comprises a pair of receiver plates each having an arcuate receiving face extending along the outer peripheral face of the pipe, the paired receiver plates extending continuously with each other with the respective receiving faces thereof being oriented in the opposite outward directions, and the respective receiver plates defining, at opposed ends thereof, engaging portions engageable respectively with opposed legs of the U-shaped bolt.

With the above-described feature of the invention, the orientations and attaching positions of the adjacent pipes may be aligned and adjusted simply by placing the respective pipes into abutment against the opposed receiving faces of the spacer device. Moreover, when the U-shaped bolt is fastened to the clamp base, the opposed legs of the U-shaped bolt are in engagement with the engaging portions of the opposed receiver plates in the vertical direction, there will occur no inadvertent change in the position and orientation of the receiver plates in the course of the fastening operation of the U-shaped bolt. Accordingly, the pipes may be clamped easily and reliably in the predetermined posture.

Hence, the adjacent pipes may be clamped with the predetermined distance therebetween efficiently and reliably. Further, as the spacer device comprises the simple construction consisting essentially of a pair of receiver plates having the arcuate receiving faces and the engaging portions, the reduction of manufacturing costs may be further promoted.

Further and other features and advantages of the present invention will become apparent from the following detailed description of the preferred embodiments thereof with reference to the accompanying drawings.

DETAILED DESCRIPTION OF THE PREFERRED EMBODIMENTS

[First Embodiment]

Figure 1:
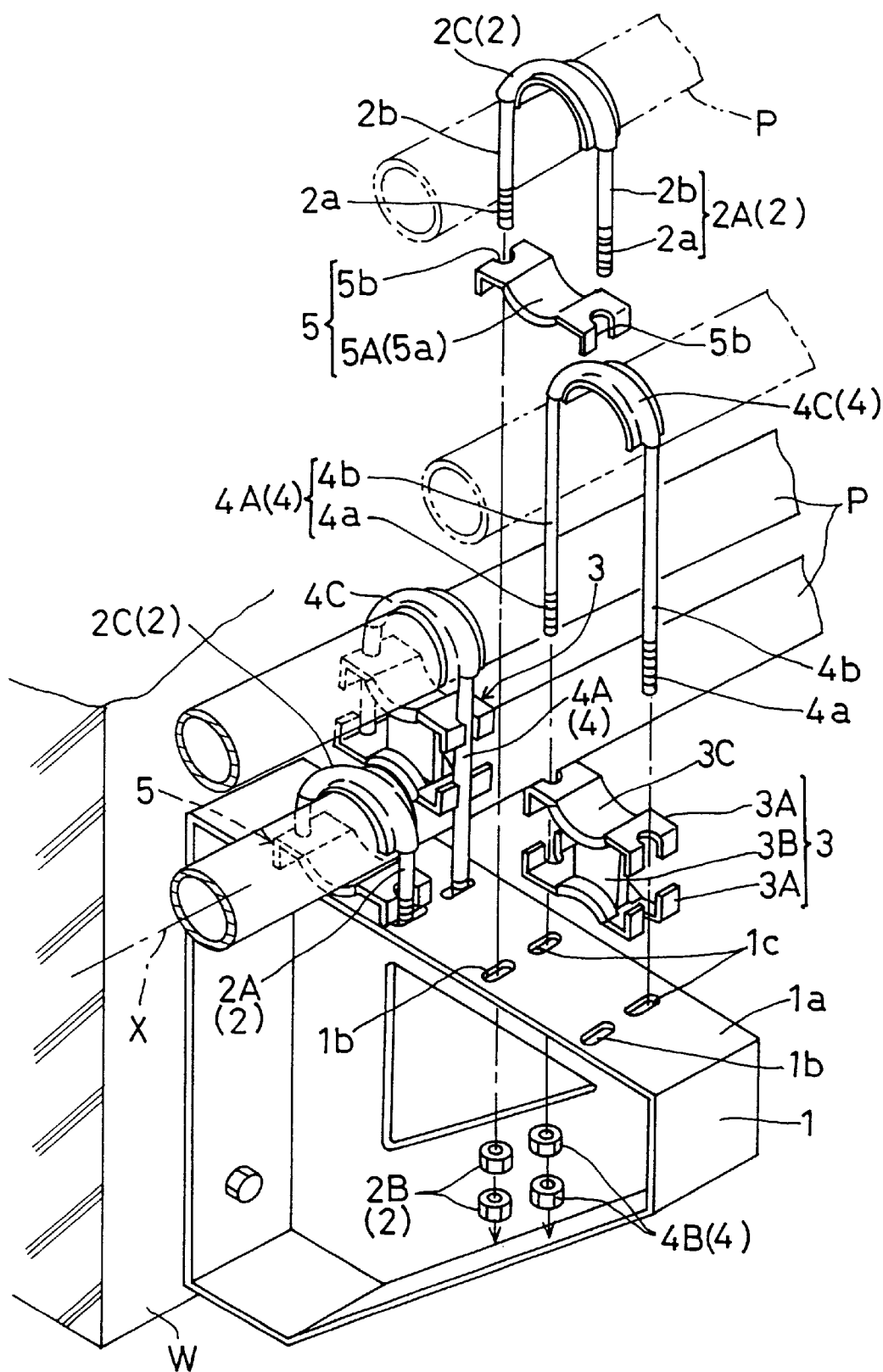
FIG. 1 is a partially exploded perspective view illustrating a first embodiment of the invention.
Figure 2:
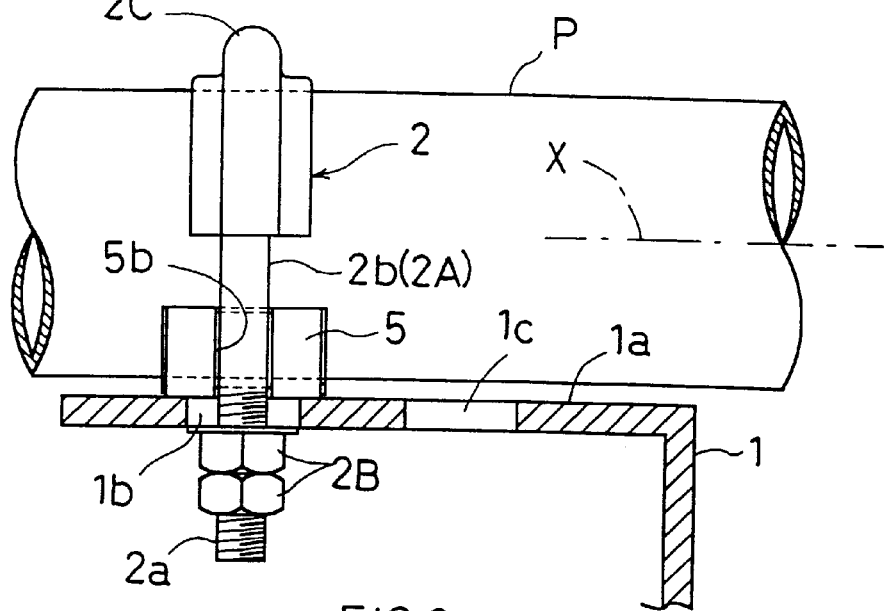
FIG. 2 is a side view in section showing a condition when one pipe P in the lowest layer has been clamped.
Figure 3:
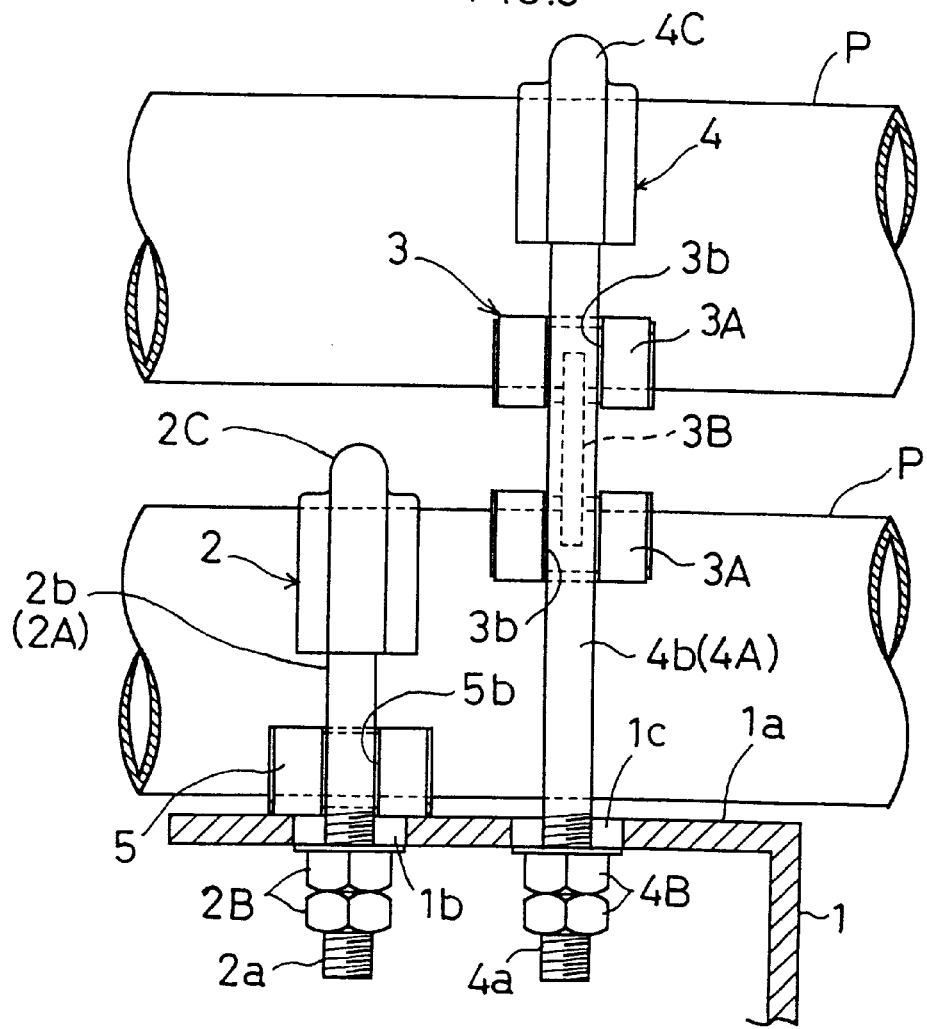
FIG. 3 is a side view in section showing a condition when two pipes P have been clamped.

FIGS. 1–4 and 7 illustrate a pipe clamping method relating to the first embodiment of the present invention. As shown, two pipes are clamped in a parallel or substantially parallel posture to each other to a horizontally extending pipe clamping face 1a of a clamp base 1 in a direction ("vertical direction" hereinafter) perpendicular or substantially perpendicular to the clamping face 1a. The clamp base 1 is fastened by means of appropriate fastener means such as anchor bolts to an attached face W which may be a wall surface of a tunnel or any other building structure. In this method, of the two pipes P, one pipe P in the lower layer is clamped to the pipe clamping face 1a of the clamp base 1 by means of a first clamper 2. Thereafter, the other pipe is clamped to the clamping face 1a of the clamp base 1 by means of a second clamper 4, with a spacer device 3 being interposed between this pipe and the first pipe P clamped by the first clamper 2.

Figure 4:
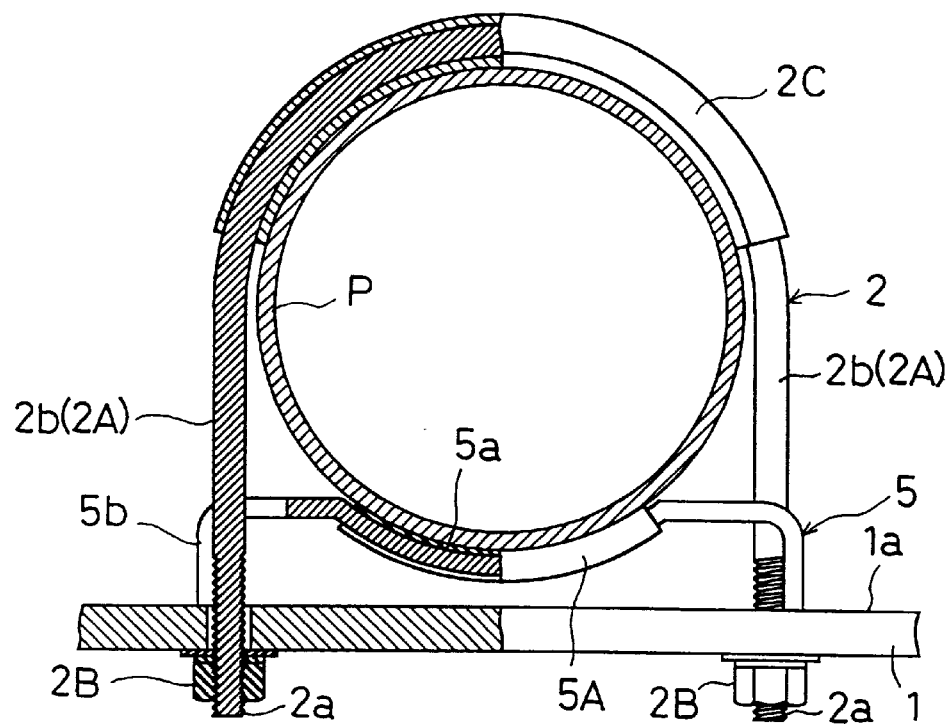
FIG. 4 is a side view in section showing the condition when the one pipe in the lowest layer has been clamped.
Figure 5:
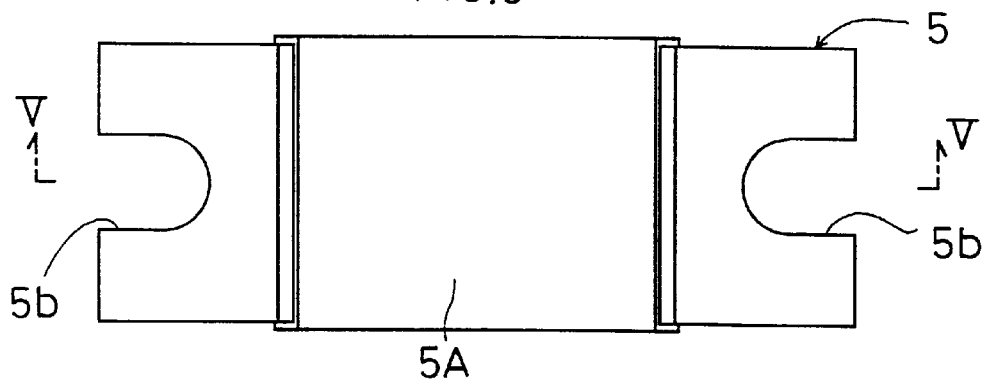
FIG. 5 is a plan view showing a cradle.
Figure 6:
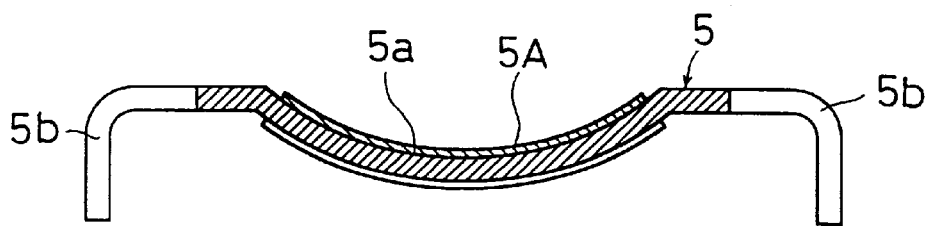
FIG. 6 is a section taken along a line V—V in FIG. 5.
Figure 7:
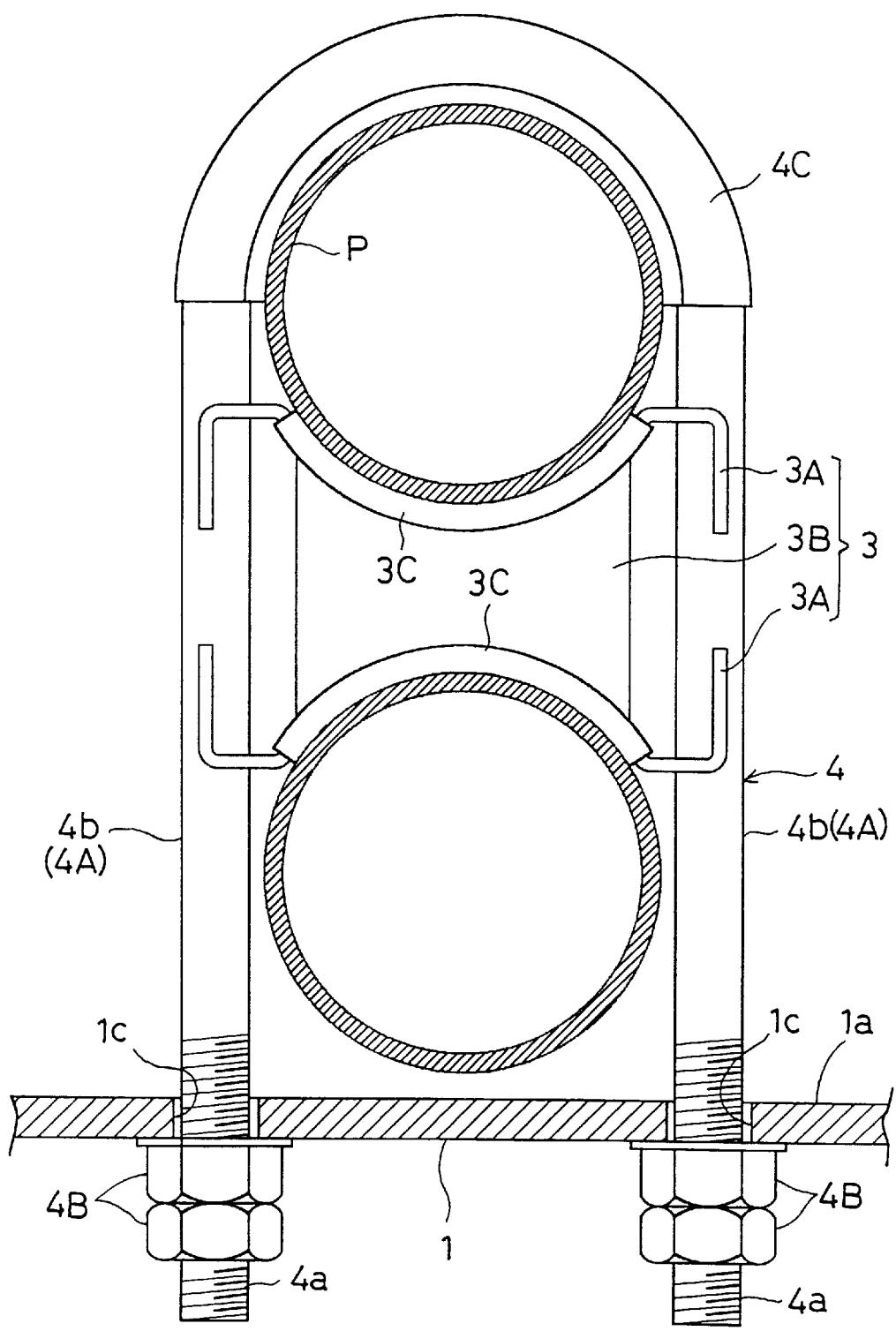
FIG. 7 is front view in section showing a condition when two pipes have been clamped.
Figure 8:
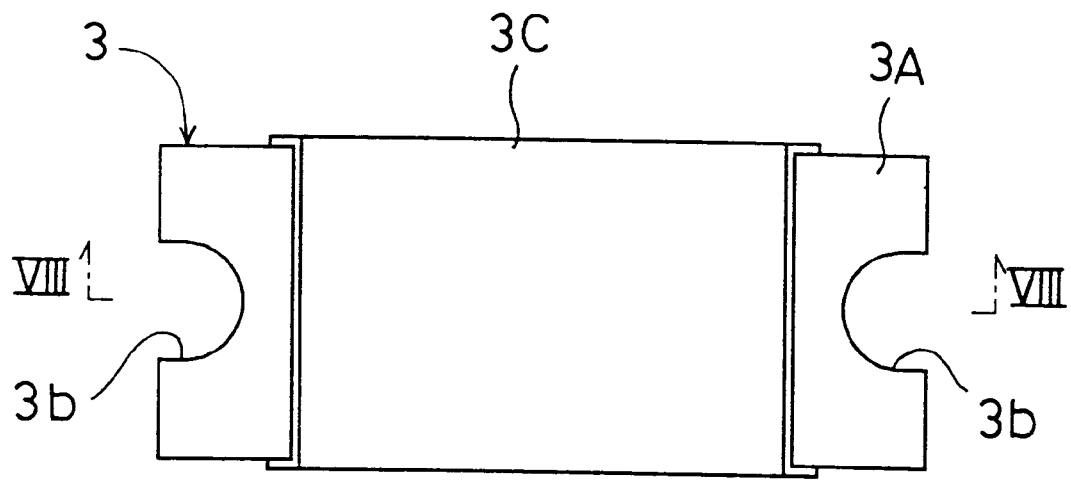
FIG. 8 is a plan view showing a spacer device.
Figure 9:
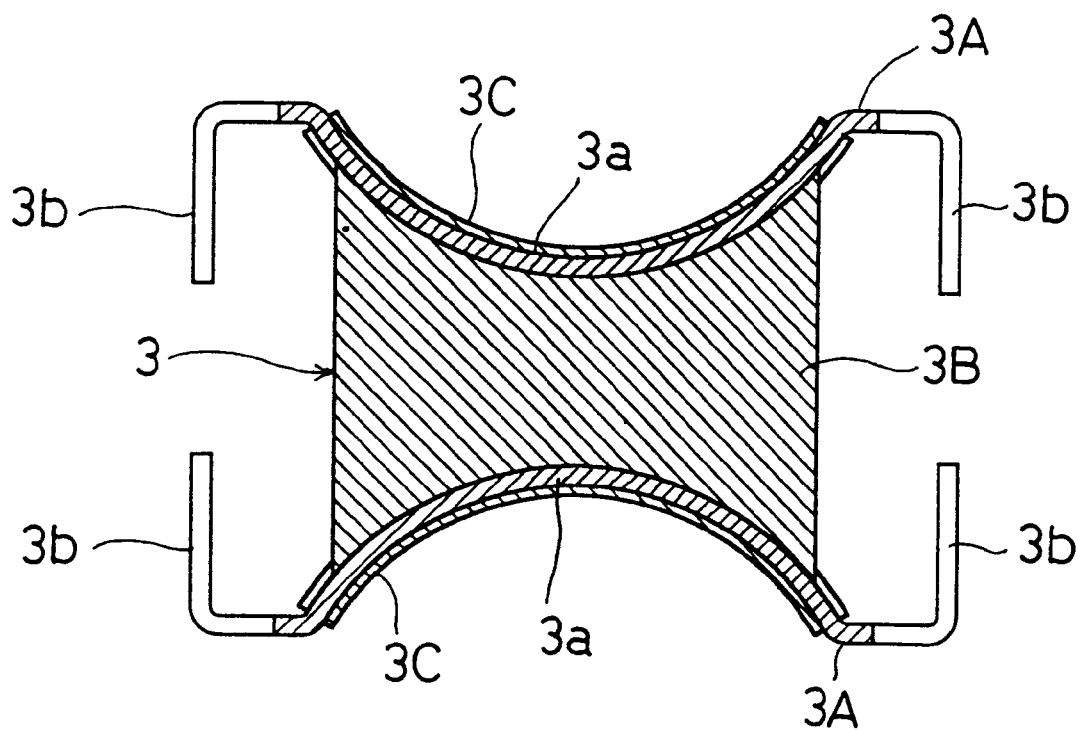
FIG. 9 is a section taken along a line VIII—VIII in FIG. 8.

The first clamper 2 consists essentially of a U-shaped bolt 2A of a short length having a letter-U like bent shape whose radius is slightly greater than the outer diameter of the pipe 1 and of nuts 2B to be engaged with male thread portions formed on the opposed ends of the U-shaped bolt 2A Further, as shown in FIG. 4, to a pipe pressing portion of the U-shaped bolt 2A, there is attached a protective cover 2C made of soft synthetic resin material to be elastically deformed when placed in pressure contact with the pipe P.

Similarly, the second clamper 4 consists essentially of a U-shaped bolt 4A of a long length having a letter-U like bent shape whose radius is slightly greater than the outer diameter of the pipe 1 and of nuts 4B to be engaged with male thread portions formed on the opposed ends of the U-shaped bolt 4A Further, to a pipe pressing portion of the U-shaped bolt 4A, there is attached a protective cover 4G made of soft synthetic resin material to be elastically deformed when placed in pressure contact with the pipe P.

On the other hand, the pipe clamping face 1a of the clamp base 1 defines, at one or more portions along the length thereof, a first attaching hole 1b for the U-shaped bolt 2A of the first clamper 2 and a second attaching hole 1c for the U-shaped bolt 4A of the second clamper 4, with the first and second attaching holes 1b, 1c being spaced apart by a predetermined distance therebetween in the pipe axis X direction. Each of the first and second attaching holes 1b, 1c is provided as an oval slot whose major axis extends along the pipe axis X direction. The length of the major axis of the slot provides an adjustable margin for adjusting the attaching position of the first clamper 2 or second clamper 4 relative to the clamp base 1.

Incidentally, these first and second attaching holes 1b, 1c are of an identical shape and size, so that either of them 1b, 1c may be employed for attaching the first and second clampers 2, 4.

Further, as shown in FIGS. 1–6, between the pipe clamping face 1a of the clamp base 1 and the face of the lowest layer pipe P opposed thereto, there is interposed a cradle 5 formed of a metal plate and having an arcuate receiving face 5a which extends along the outer peripheral face of the pipe P.

This cradle 5 defines, at opposed lateral ends thereof, engaging recesses 5b into which opposed legs 2b of the U-shaped bolt 2A of the first clamper 2 may be removably engaged in the vertical direction. Further, to the arcuate receiving face 5a, there is attached a protective cover 4C made of soft synthetic resin material to be elastically deformed when placed in pressure contact with the pipe P.

As shown in FIGS., 1, 3 and 7 through 9, the spacer device 3 consists essentially of a pair of receiver plates 3A formed of metal plates each having an arcuate receiving face 3a extending along the outer peripheral face of the pipe P, and a bridging plate 3B for bridging the two receiver plates 3A together with the arcuate receiving faces 3a thereof being oriented in the opposite outward directions to each other. Each receiver plate 3A defines, at opposed lateral ends thereof, engaging recesses 3b into which opposed legs 2b of the U-shaped bolt 4A of the second fastener 4 may be removably engaged in the vertical direction. Further, to the arcuate receiving face 3a of each receiver plate 3A, there is attached a protective cover 3C made of soft synthetic resin material to be elastically deformed when placed in pressure contact with the pipe P.

Further, when there arises necessity of adding one or more new pipes to the existing two pipes P clamped by the two clampers 2, 4, the U-shaped bolt 2A of the first clamper 2 will be disengaged from the pipe clamping face 1a of the clamp base 1. Then, the new pipe P will be clamped to the pipe clamping face of the clamp base by using a U-shaped bolt of a third clamper (identical to a U-shaped bolt to a U-shaped bolt 4A of a second clamper 4 employed in a second embodiment to be described later) with the spacer device 3 being interposed between this new pipe P and the uppermost layer one P of the two existing pipes. Therefore, even when the U-shaped bolt 2A of the first clamper 2 is removed, the two existing pipes P remain clamped. Further, the U-shaped bolt of the third clamper may be attached by using the first attachment hole 1b of the clamp base 1 in which the U-shaped bolt 2A of the first clamper 2 was previously attached Hence, the clamp base 1 need not be replaced.

Figure 10:
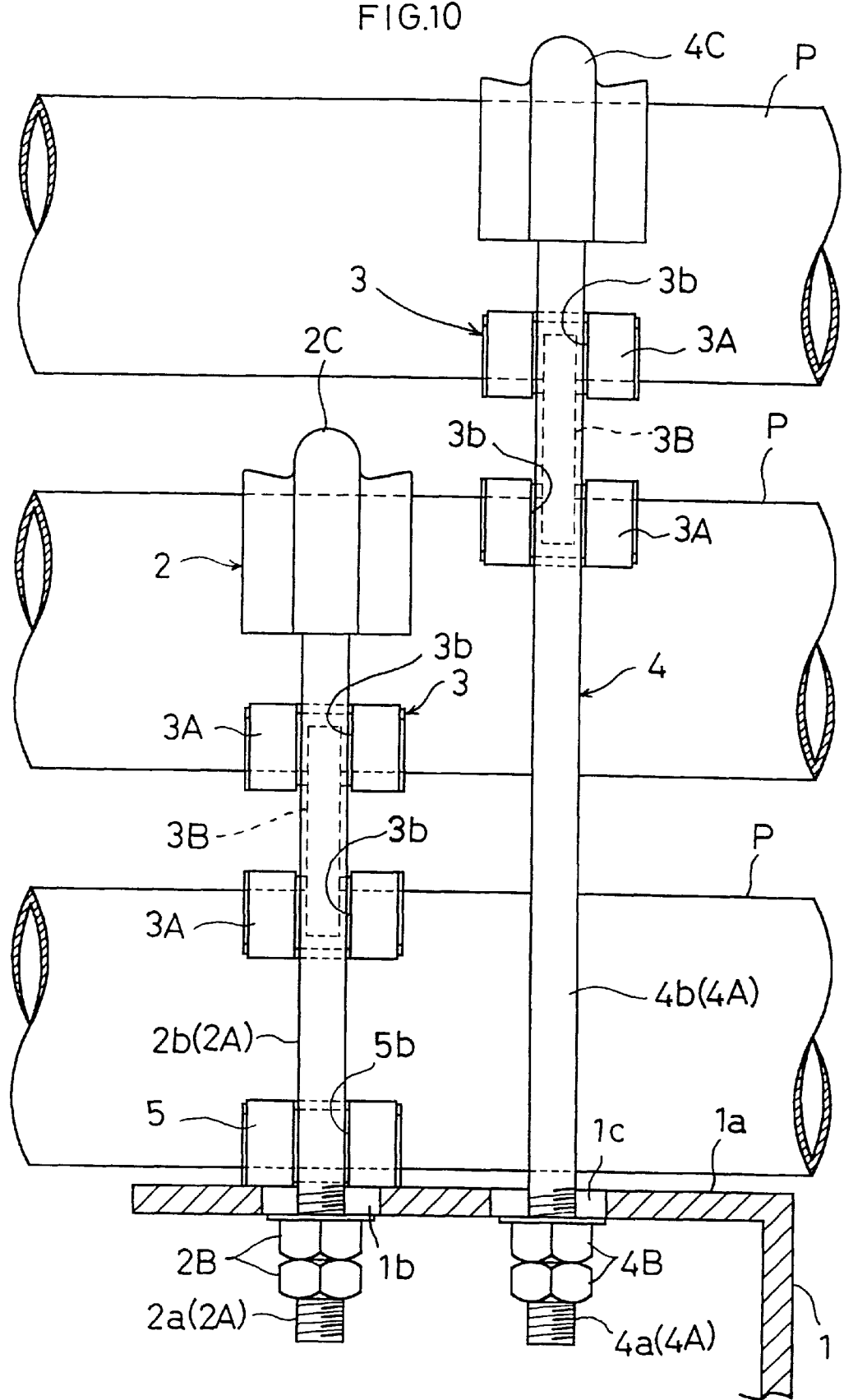
FIG. 10 is a side view in section illustrating a second embodiment and showing a condition when three pipes P have been clamped.
Figure 11:
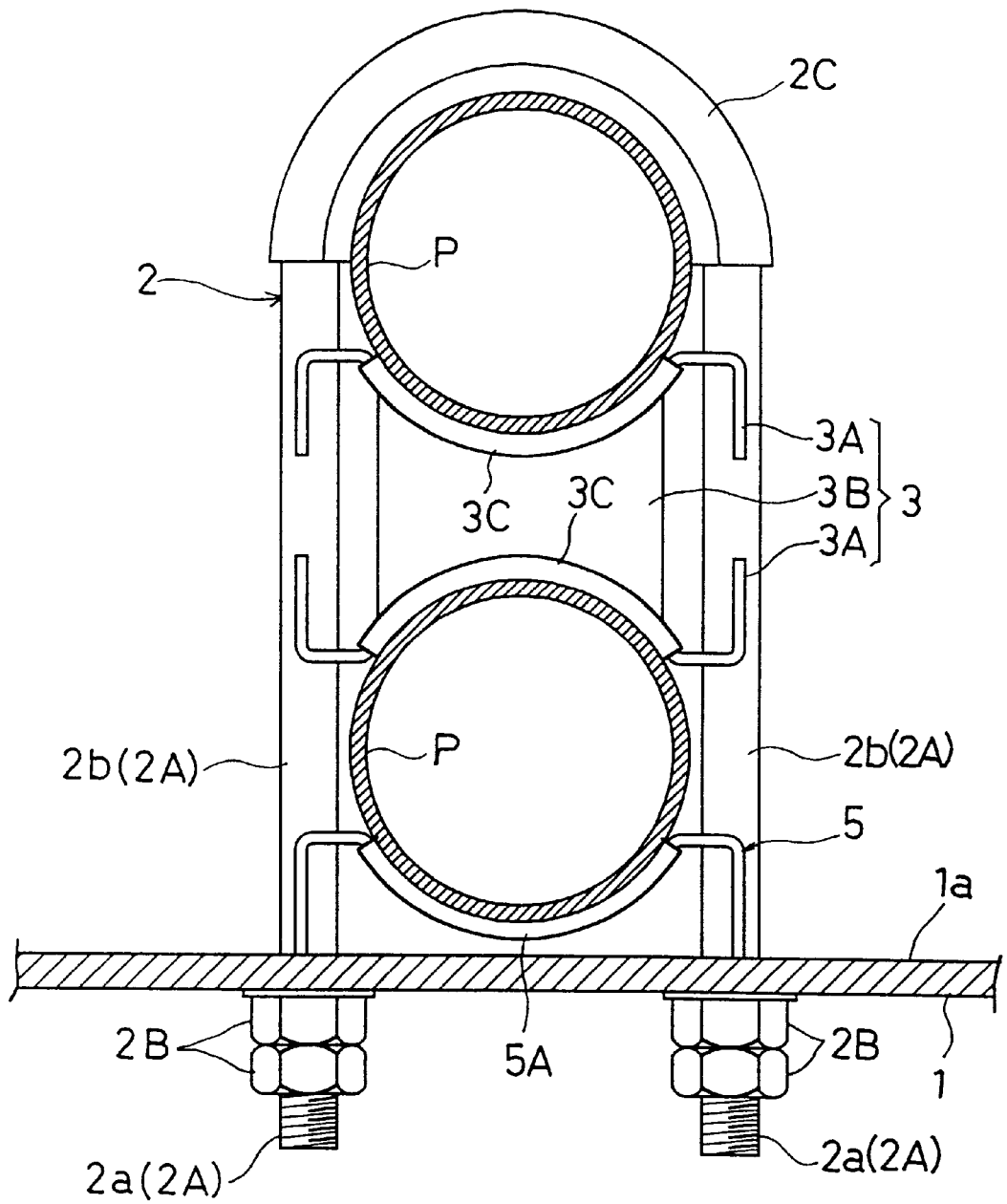
FIG. 11 is a front view in section showing a condition in which two pipes P have been clamped.
Figure 12:
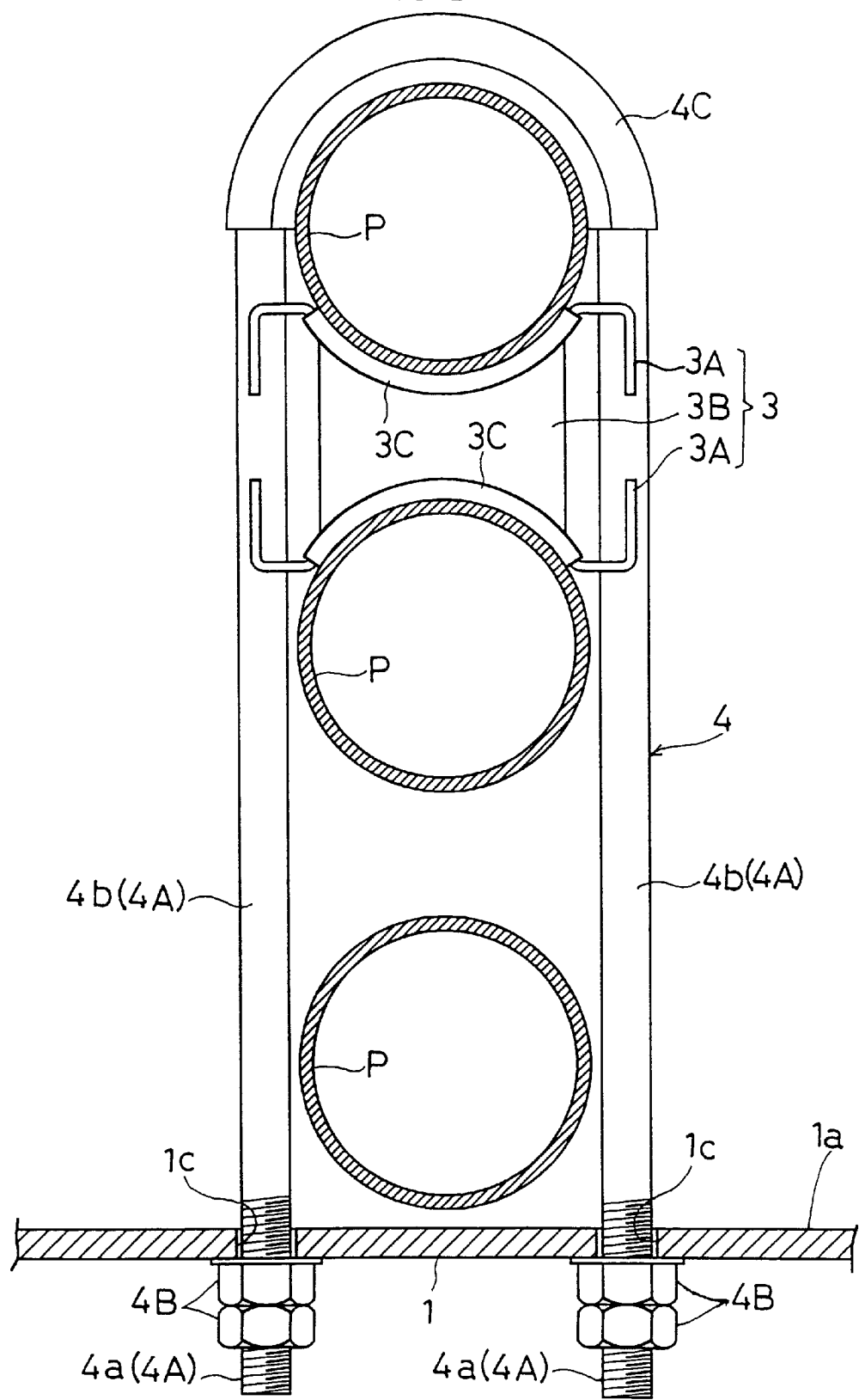
FIG. 12 is a front view in section showing a condition in which three pipes P have been clamped.
Figure 13:
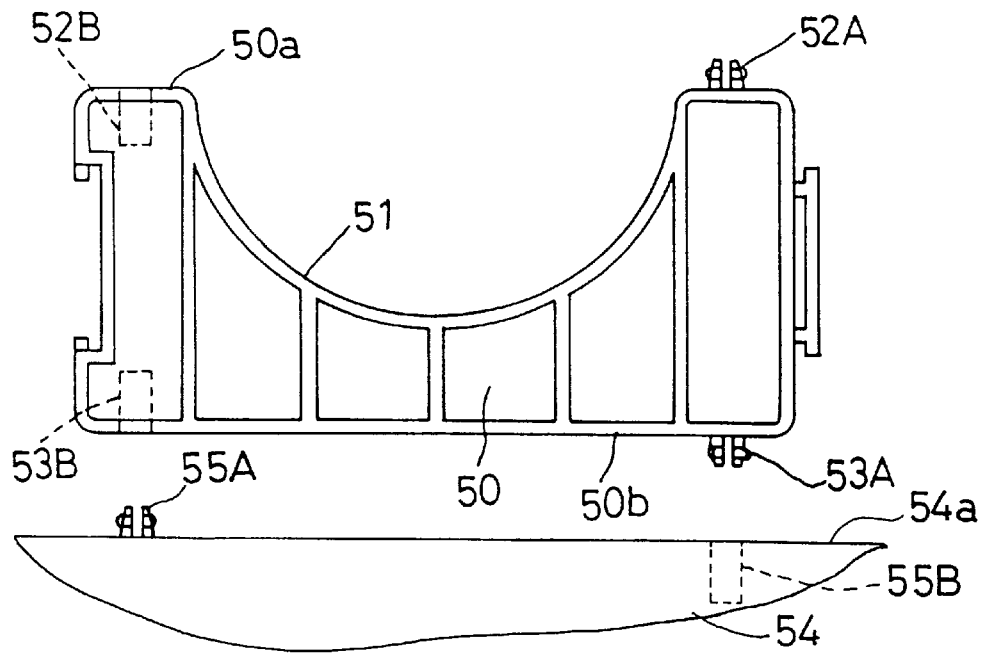
FIG. 13 is an enlarged front view of principal portions relating to a conventional pipe clamping method.
Figure 14:
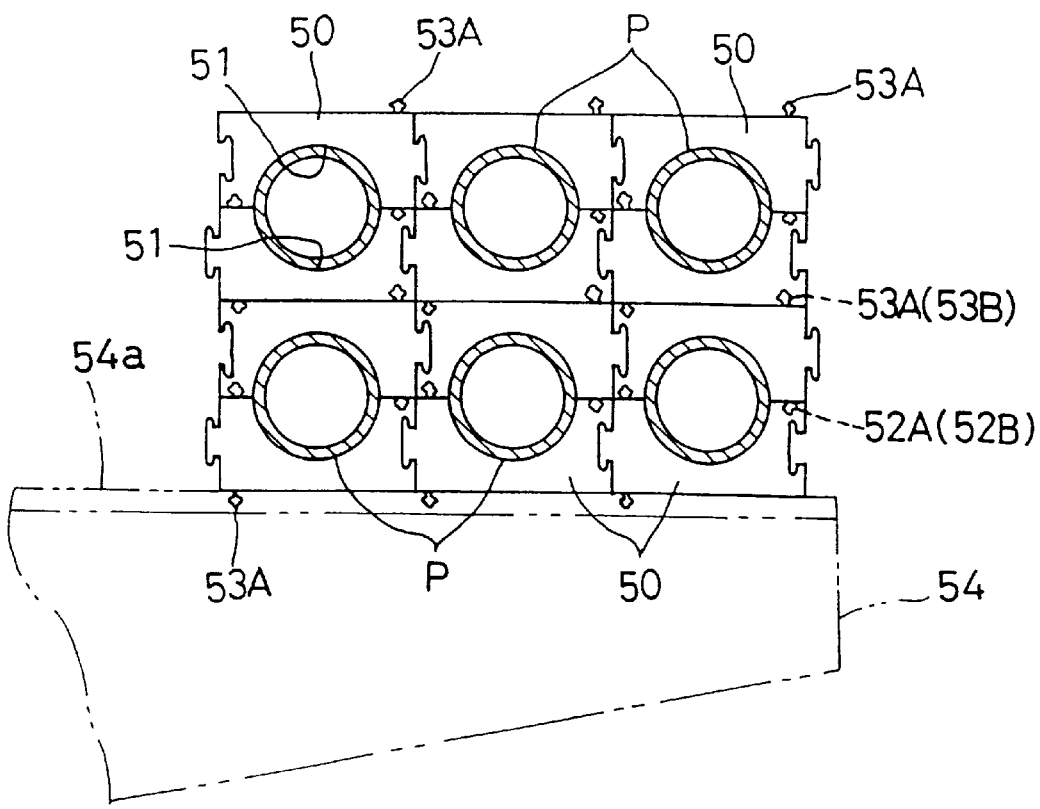
FIG. 14 is an overall front view in section illustrating the conventional pipe clamping method.
Figure 15:
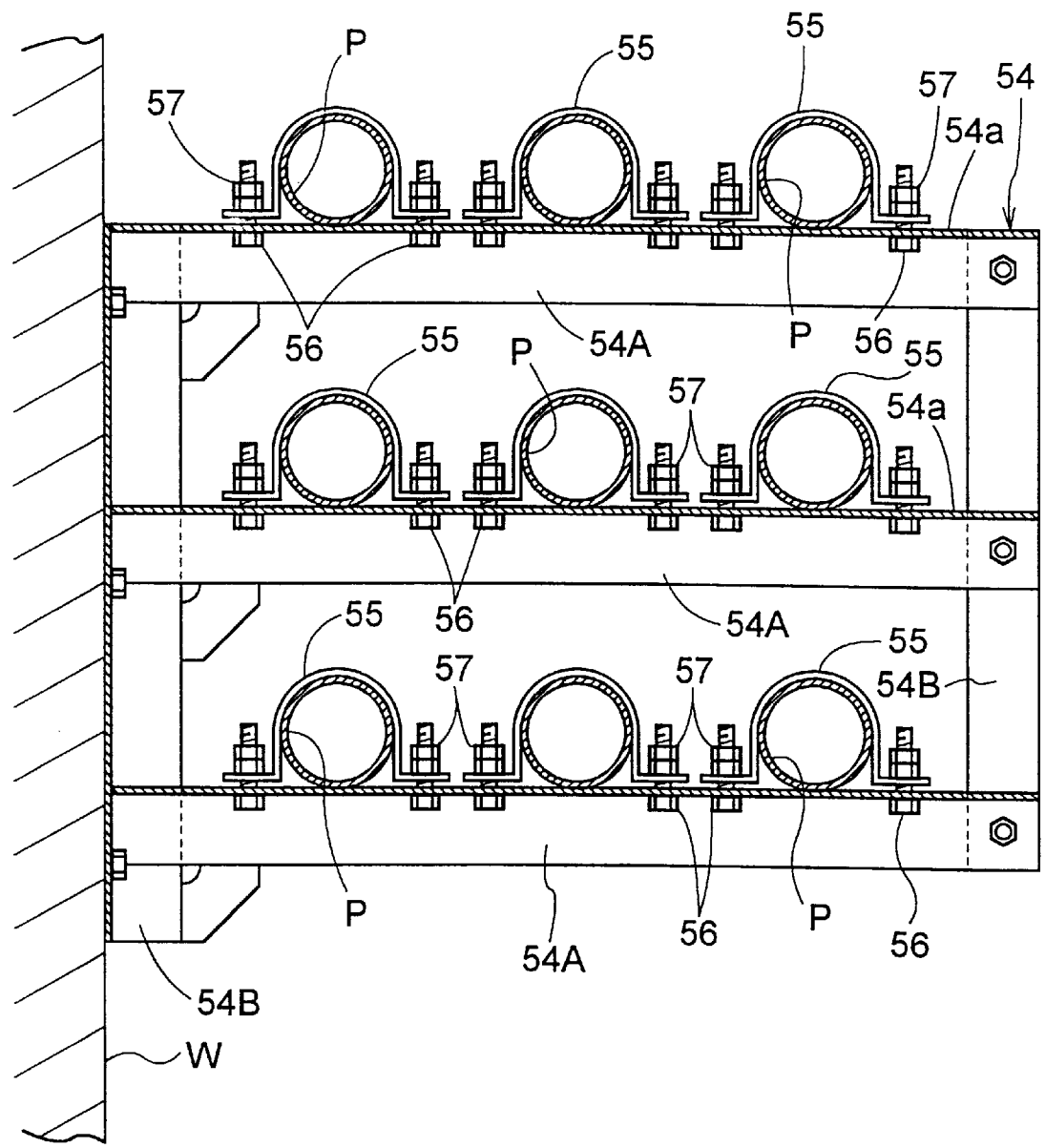
FIG. 15 is a front view in section showing a typical conventional method of clamping pipes.

Then, the condition after completion the above-described operation of adding the new pipe P is completed is same as the condition shown in FIGS. 10–12 relating to the second embodiment. Namely, the U-shaped bolt 4A of the second clamper 4 corresponds to the U-shaped bolt 2A of the first clamper 2 of the second embodiment and the U-shaped bolt of the third clamper corresponds to the U-shaped bolt 4A of the second clamper 4 of the second embodiment.

[Second Embodiment]

FIGS. 10–12 illustrate a pipe clamping method relating to the second embodiment of the present invention. In this method, three pipes P are clamped in a parallel or substantially parallel posture to each other to the horizontally extending pipe clamping face 1a of the clamp base 1 in a direction ("vertical direction" hereinafter) perpendicular or substantially perpendicular to the clamping face 1a. In this method, of the three pipes P, two pipes P (example of predetermined number of pipes) disposed in the lower layer and spaced apart from each other by the spacer device 3 interposed therebetween are clamped to the pipe clamping face 1a of the clamp base 1 by means of the first clamper 2. Thereafter, the other pipe P is clamped to the clamping face 1a of the clamp base 1 by means of the second clamper 4, with the spacer device 3 being interposed between this pipe P and the uppermost layer pipe P clamped by the first clamper 2.

Incidentally, this second embodiment differs from the foregoing first embodiment only in that the length of the U-shaped bolt 4A of the second clamper 4 is longer by one clamping pitch than that of the U-shaped bolts 2A, 4A employed in the first embodiment. The other portions of the construction of this second embodiment are same as those of the first embodiment. Therefore, identical components to those of the first embodiment are denoted with identical reference marks and will not be described again here.

[Other Embodiments]

In the first embodiment, two pipes are clamped and in the second embodiment three pipes are clamped. Alternatively, the method of the present invention may be applied to a case for clamping more than four pipes.

Also, when a plurality of pipes P are to be clamped by the second clamper 4, these pipes are to be clamped with the spacer device 3 being interposed between the adjacent pipes P.

Further, when the total number of the pipes P to be clamped by the first clamper 2 and the second clamper 4 exceeds four, the last pipe P may be clamped by using the third clamper consisting of a U-shaped bolt and nuts just like the first clamper 2 and the second clamper 4.

In the spacer device 3, the engaging portions 3b described in the foregoing embodiments and defined respectively in the pair of arcuate receiving faces 3a may be eliminated.

What is essential for the spacer device according to the present invention is that the device include a pair of substantially arcuate receiving faces 3a to respectively come into contact with the outer peripheral face of the two adjacent pipes P. The specific shape of this spacer device is not particularly limited in the present invention.

What is claimed is:

1. A method of clamping a plurality of pipes to a pipe clamping face of a clamp base in such a manner that the pipes are clamped to the pipe clamping face one above another with a predetermined space therebetween in a direction perpendicular or substantially perpendicular to the pipe clamping face, the method comprising the steps of:

a first step of clamping at least the pipe of the plurality of pipes located nearest the pipe clamping face of the clamp base to the pipe clamping face by using a first clamper, wherein the first clamper includes at least one leg inserted into at least one hole defined in the clamping face to clamp the first clamper to the clamping face; and a second step of clamping subsequently at least one of the remaining pipes to the pipe clamping face of the clamp base by using a second clamper with a spacer device being interposed between the pipe and the pipe clamped by the first clamper, wherein the second clamper includes at least one leg inserted into at least one hole defined in the clamping face to clamp the first clamper to the clamping face.

2. A method of clamping a plurality of pipes to a pipe clamping face of a clamp base in such a manner that the pipes are clamped to the pipe clamping face one above another with a predetermined space therebetween in a direction perpendicular or substantially perpendicular to the pipe clamping face, the method comprising the steps of:

clamping at least the pipe of the plurality of pipes located nearest the pipe clamping face of the clamp base to the pipe clamping face of the clamp base by using a first clamper; and clamping subsequently at least one of the remaining pipes of the plurality of pipes to the pipe clamping face of the clamp base by using a second clamper with a spacer device being interposed between a pipe clamped by the second clamper and a pipe clamped by the first clamper, wherein the first clamper and the second clamper each comprise a U-shaped bolt and a pair of nuts threaded to opposed ends of the U-shaped bolt, and each U-shaped bolt exhibits a substantially U configuration as viewed along the axial direction of the pipe and is adapted to extend through attachment holes in the pipe clamping face of the clamp base with the holes receiving the U-shaped bolt of the first clamper being spaced apart from the holes receiving the U-shaped bolt of the second clamper in the axial direction of the pipe.

3. The method according to claim 2, wherein between the pipe clamping face of the clamp base and an adjacent pipe, there is provided a cradle having an arcuate receiving face extending along the outer peripheral face of the pipe and a pair of engaging portions engageable respectively with opposed legs of th U-shaped bolt in the perpendicular direction.

4. A spacer device for use in regulating space between adjacent pipes when a plurality of pipes is clamped to a pipe clamping face of a clamp base in a direction perpendicular or substantially perpendicular to the pipe clamping face with a predetermined space therebetween by using a U-shaped bolt inserted into attachment holes defined in the pipe clamping face and nuts to be threaded to opposed ends of the U-shaped bolt, the spacer comprising:

a pair of receiver plates each having an arcuate receiving face, the pair of receiver plates being connectable with each other in such a manner that the respective receiving faces thereof face away from each other to come into contact with the adjacent pipes respectively.

5. A construction for clamping a plurality of pipes to a pipe clamping face of a clamp base in such a manner that the pipes are clamped to the pipe clamping face one above another with a predetermined space therebetween in a direction perpendicular or substantially perpendicular to the pipe clamping face, which comprises:

a spacer device for use in regulating space between adjacent pipes;

a first clamper for clamping at least one pipe of the plurality of pipes located nearest the pipe clamping face of the clamp base to the pipe clamping face, wherein the first clamper includes at least one leg that is inserted into at least one hole defined in the pipe clamping face; and a second clamper for subsequently clamping the at least one remaining pipe of the plurality of pipes to the pipe clamping face with the spacer device being interposed between the remaining pipe and the pipe clamped by the first clamper, wherein the second clamper includes at least one leg that is inserted into at least one hole defined in the pipe clamping face.

6. A construction for clamping a plurality of pipes to a pipe clamping face of a clamp base in such a manner that the pipes are clamped to the pipe clamping face one above another with a predetermined space therebetween in a direction perpendicular or substantially perpendicular to the pipe clamping face, which comprises:

a spacer device for use in regulating space between adjacent pipes;

a first clamper for clamping at least one pipe of the plurality of pipes located nearest the pipe clamping face of the clamp base to the pipe clamping face of the clamp base; and a second clamper for subsequently clamping the at least one remaining pipe of the plurality of pipes to the pipe clamping face of the clamp base with the spacer device being interposed between a pipe clamped by the second clamper and a pipe clamped by the first clamper, wherein the first clamper and the second clamper each comprise a U-shaped bolt exhibiting a substantially U configuration as viewed along the axial direction of the pipe and a pair of nuts threaded to opposed ends of the U-shaped bolt, and the U-shaped bolt of the first clamper and the U-shaped bolt of the second clamper are adapted to extend through attachment holes in the pipe clamping face with the holes receiving the U-shaped bolt of the first clamper being spaced apart from the holes receiving the U-shared bolt of the second clamper in the axial direction of the pipe.

7. The construction according to claim 6, further including a cradle between the pipe clamping face of the clamp base and an adjacent pipe, wherein the cradle has an arcuate receiving face extending along the outer peripheral face of the adjacent pipe and a pair of engaging portions engageable respectively with opposed legs of the U-shaped bolt.

8. The spacer device according to claim 4, wherein each receiver plate defines, at opposed ends thereof, engaging portions engageable with opposed legs of the U-shaped bolt along the perpendicular direction.

9. A method of clamping a plurality of pipes to a pipe clamping face of a clamp base in such a manner that the pipes are clamped to the pipe clamping face one above another with a predetermined space therebetween in a direction perpendicular or substantially perpendicular to the pipe clamping face, the method comprising the steps of:

a first step of clamping at least the pipe of the plurality of pipes located nearest the pipe clamping face of the clamp base to the pipe clamping face by using a first clamper; and a second step of clamping subsequently at least one of the remaining pipes to the pipe clamping face by using a second clamper with a spacer device being interposed between the remaining pipe and the pipe clamped by the first clamper, wherein the second clamper is directly clamped to the pipe clamping face.

10. The method of clamping according to claim 9, wherein the second clamper includes at least one leg inserted into at least one hole defined in the clamping face.

11. The method of clamping according to claim 9, wherein the second clamper includes at least a pair of legs inserted into holes defined in the clamping face so as to clamp the second clamper to the clamping face.

12. A construction for clamping a plurality of pipes to a pipe clamping face of a clamp base in such a manner that the pipes are clamped to the pipe clamping face one above another with a predetermined space therebetween in a direction perpendicular or substantially perpendicular to the pipe clamping face, which comprises:

a spacer device for use in regulating space between adjacent pipes;

a first clamper for clamping at least one pipe of the plurality of pipes located nearest the pipe clamping face of the clamp base to the pipe clamping face; and a second clamper for subsequently clamping the at least one remaining pipe of the plurality of pipes to the pipe clamping face with the spacer device being interposed between the remaining pipe and the pipe clamped by the first clamper, wherein the second clamper is directly clamped to the clamping face.

13. The construction according to claim 12, wherein the second clamper includes at least one leg that is inserted into at least one hole defined in the pipe clamping face.

14. The construction according to claim 12, wherein the second clamper includes at least a pair of legs that is inserted into holes defined in the pipe clamping face.

* * * * *

UNITED STATES PATENT AND TRADEMARK OFFICE
CERTIFICATE OF CORRECTION

PATENT NO : 6,142,428
DATED : November 7, 2000
INVENTOR(S) : Kasaku Kamata et al.

It is certified that error appears in the above-identified patent and that said Letters Patent is hereby corrected as shown below:

Column 5, Line 5, "side" should read --front--.

Column 5, Line 54, after "2A" insert --.--(period).

Column 5, Line 64, after "4A" insert --.--(period).

Column 5, Line 65, "4G" should read --4C--.

Claim 3, Column 8, Line 39, "th" should read --the--.

Claim 3, Column 8, Lines 39-40, after "bolt" delete --in the perpendicular direction--.

Claim 6, Column 9, Line 36, "U-shared" should read --U-shaped--.

Signed and Sealed this

Twenty-ninth Day of May, 2001

Attest:

NICHOLAS P. GODICI

*Attesting Officer*    *Acting Director of the United States Patent and Trademark Office*